US012753319B2

(12) United States Patent
Burckhardt et al.

(10) Patent No.: US 12,753,319 B2
(45) Date of Patent: Oct. 6, 2026

(54) METHOD FOR PRODUCING A LAMINATE OF WOOD AND CEMENTITIOUS COMPOSITIONS

(71) Applicants: SIKA TECHNOLOGY AG, Baar (CH); EMPA EIDGENÖSSISCHE MATERIALPRÜFUNGS—UND FORSCHUNGSANSTALT, Dübendorf (CH)

(72) Inventors: Urs Burckhardt, Zürich (CH); Ingo Burgert, Zürich (CH); Fabien Choffat, Rüttenen (CH); Philippe Grönquist, Zürich (CH); Steffen Kelch, Oberengstringen (CH); Sanja Kostic, Olten (CH); Tim Mamie, Zürich Altstetten (CH); Klaas Mennecke, Lottstetten (DE); Ursula Stadelmann, Zürich (CH); Stefan Vögtli, Lupsingen (CH); Andrea Frangi, Rüchlikon (CH); Sandro Stucki, Zürich (CH)

(73) Assignees: SIKA TECHNOLOGY AG, Baar (CH); EMPA EIDGENÖSSISCHE MATERIALPRÜFUNGS—UND FORSCHUNGSANSTALT, Dübendorf (CH)

( * ) Notice: Subject to any disclaimer, the term of this patent is extended or adjusted under 35 U.S.C. 154(b) by 119 days.

(21) Appl. No.: 18/714,284

(22) PCT Filed: Nov. 23, 2022

(86) PCT No.: PCT/EP2022/082966

§ 371 (c)(1),
(2) Date: May 29, 2024

(87) PCT Pub. No.: WO2023/099306

PCT Pub. Date: Jun. 8, 2023

(65) Prior Publication Data

US 2025/0019558 A1 Jan. 16, 2025

(30) Foreign Application Priority Data

Nov. 30, 2021 (EP) .................................... 21211443

(51) Int. Cl.
*C09D 15/00* (2006.01)
*C04B 28/04* (2006.01)
(Continued)

(52) U.S. Cl.
CPC .............. *C09D 15/00* (2013.01); *C04B 28/04* (2013.01); *C09D 5/002* (2013.01); *C09D 163/00* (2013.01); *C04B 2111/00543* (2013.01)

(58) Field of Classification Search
CPC . B05D 7/06; B05D 7/52; C09D 15/00; C09D 163/00; C09D 5/002; C04B 28/04; E04C 3/122
(Continued)

(56) References Cited

U.S. PATENT DOCUMENTS 6,734,275 B2 * 5/2004 Pirhonen ................ C08L 61/24 428/511
2017/0292050 A1 10/2017 Burckhardt et al.
2022/0145144 A1 5/2022 Mennecke et al.

FOREIGN PATENT DOCUMENTS

DE 197 29 058 A1 1/1999
DE 10 2016 001 185 A1 8/2017
(Continued)

OTHER PUBLICATIONS

Feb. 15, 2023 International Search Report issued in International Patent Application No. PCT/EP2022/082966.
(Continued)

*Primary Examiner* — James D Sells
(74) *Attorney, Agent, or Firm* — Oliff PLC

(57) ABSTRACT

A method for producing a laminate, wherein a wooden element is provided, the wooden element is coated on the top
(Continued)

side with a an adhesive that is applied in liquid form and includes at least one polymer that is liquid at room temperature and contains silane groups, at least one liquid epoxy resin and at least one amine hardener, the applied adhesive is covered with a layer of a liquid cementitious composition while still wet, and the liquid cementitious composition and the adhesive each cure. The method enables the durable joining of wooden elements and cementitious elements in an easy-to-implement, wet-on-wet method. The laminates obtained from the method are comparatively light, stable and robust and are especially suitable as sustainable components in above-ground construction.

17 Claims, 1 Drawing Sheet

(51) Int. Cl.

| | |
|---|---|
| ***C09D 5/00*** | (2006.01) |
| ***C09D 163/00*** | (2006.01) |
| *C04B 111/00* | (2006.01) |

(58) Field of Classification Search
USPC .......................................................... 156/307.3
See application file for complete search history.

(56) References Cited

FOREIGN PATENT DOCUMENTS

| | | | |
|---|---|---|---|
| EP | 0 370 464 | A2 | 5/1990 |
| WO | 2006/097962 | A1 | 9/2006 |

OTHER PUBLICATIONS

May 2, 2024 International Preliminary Report on Patentability issued in International Patent Application No. PCT/EP2022/082966.
Brunner et al., "Timber-concrete-composite with an adhesive connector (wet on wet process)", Materials and Structures, 2007, vol. 40, pp. 119-126.
Kostic et al., "Timber-mortar composites: The effect of sol-gel surface modification on the wood-adhesive interface", Composite Structures, vol. 201, 2018, pp. 828-833.

* cited by examiner

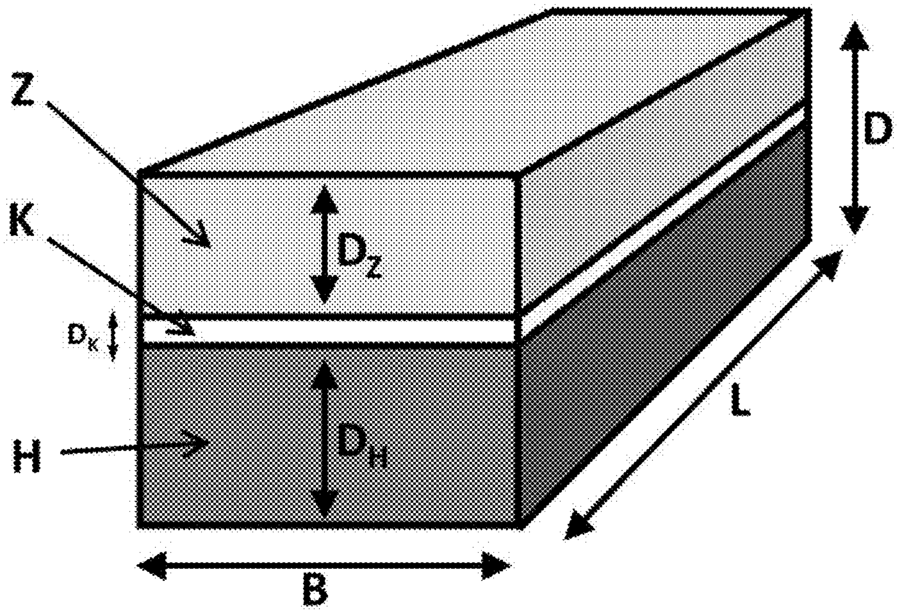
Z
K
D_K
H
D_Z
D_H
D
L
B

METHOD FOR PRODUCING A LAMINATE OF WOOD AND CEMENTITIOUS COMPOSITIONS

TECHNICAL FIELD

The invention relates to a process for producing a laminate, to a laminate, and to the use thereof as a component in building construction.

PRIOR ART

Wood, which is a renewable raw material, has been used as building material since time immemorial and has additional benefits aside from sustainability over cementitious building materials such as concrete, in particular high tensile strength coupled with low density and appealing aesthetics. Disadvantages of wood as building material lie primarily in inadequate fire resistance and acoustic conductivity, which makes it difficult to achieve fire protection and sound insulation, and in swelling and shrinking characteristics under the influence of moisture. The bonding of wood to concrete as a hybrid system (wood-concrete composite) has the advantage of combining the benefits of the two building materials with one another, in that wood can absorb tensile forces and concrete compressive forces. This can be utilized, for example, for roof constructions that have load-bearing capacity and flexural stiffness coupled with relatively low intrinsic weight and low overall height and can therefore also be used for large spans, coupled with good fire protection and sound insulation properties. For the achievement of such properties, it is crucial to achieve mutual bonding of wood and concrete, which are fundamentally different materials, with maximum shear resistance and permanence by a suitable bonding method.

The typical course of action in the bonding of wood to concrete is to bond a cured concrete body to the wood by means of metallic securing systems such as screws, bolts, clamps or anchors. Although such bonds are stable and durable, they are complex to produce and often visually unsatisfactory. A further option is to establish a mechanically stable interdigitation with the concrete by means of notches or slots in the wood, for example in that the liquid concrete cures in contact with the wood body. However, such bonds often have inadequate stability and durability, not least because of movements in the wood as a result of shrinkage or expansion owing to elevated humidity or mechanical stress.

Also known is the bonding of wood to cured concrete, for which the adhesives used are usually epoxy resin adhesives. The bonding typically requires a complex pretreatment of the concrete surface in which the cement skin on the concrete surface is mechanically removed in order to avoid disrupted curing of the adhesive and to assure a stable, durable bond.

It would be particularly attractive to establish a stable and durable bond between wood and concrete or mortar by pouring the liquid concrete or mortar onto an adhesive-coated wood surface without requiring slits or other notches needed for mechanical interdigitation in the wood surface. But the demands on such an adhesive in relation to mechanical properties, insensitivity to the highly alkaline medium of still-liquid concrete and durability are high.

M. Brunner et al., *Materials and Structures* (2007) 40:119-126, describes the bonding of wood to concrete by means of epoxy resin adhesives in a wet-on-wet method. But the epoxy resin adhesives used, because of high exothermicity after mixing, are demanding in terms of handling and are very stiff and comparatively brittle after curing, which means that the laminates break readily at the adhesive interfaces under mechanical stress or as a result of the swelling and shrinking characteristics of the wood under varying humidity. Moreover, the curing reaction of the epoxy resin adhesives is often disrupted by the fresh concrete such that insufficient bond strengths are built up and hence the result is not a durable and/or permanent bond. There is therefore a need for a simple process by which a highly durable and permanent bond can be established between wood and concrete bodies.

Curable compositions based on polymers containing silane groups and epoxy resins are known, for example from EP 370464 or US 2017/0292050. They have good bonding properties, including on water-wetted, cured concrete. It was not known to date that such adhesives can cure faultlessly and with development of high bond strengths even in contact with freshly applied, still-liquid concrete.

SUMMARY OF THE INVENTION

It is therefore an object of the present invention to provide a method of bonding wood and cementitious materials in which the cementitious material is used in liquid form and enables a highly durable and permanent bond.

This object is surprisingly achieved by a method of producing a laminate as described in claim 1. This involves coating a wood body with an adhesive applied in liquid form, comprising at least one polymer containing silane groups, at least one liquid epoxy resin and at least one amine curing agent, and then overcoating the still predominantly uncured adhesive with a liquid cementitious composition, wherein the cementitious composition and the adhesive ultimately cure.

The method of the invention is easily and rapidly performable, and the adhesive used surprisingly enables overcoating with a liquid cementitious composition, such as concrete or mortar freshly made up with water, in a wet-on-wet method, without occurrence of the problems known from the prior art. In particular, there is no occurrence of excessive exothermicity in the freshly mixed adhesive, which causes problems with application and open time, and the still predominantly uncured adhesive applied, after overcoating with a liquid cementitious composition such as fresh concrete or fresh mortar, cures faultlessly and with development of high bond strengths to the wood body and to the hydraulically setting cementitious composition that likewise cures in parallel. The curing gives rise to a laminate in which the cementitious composition and the wood are bonded fixedly and permanently to one another via the cured adhesive. Even after the laminate has been stored for 24 h in water at room temperature, the bond between the cured cementitious composition and the wood is sufficiently mechanically stable, even when the wood undergoes some degree of swelling as a result of absorption of water.

Compared to epoxy resin adhesives that are free of polymers having silane groups, the adhesive used in accordance with the invention has faultless curing, relatively low exothermicity, and mechanical properties of better suitability for this application. In particular, it shows high extensibility and impact resistance, whereas pure epoxy resin adhesives typically have stiff and comparatively rigid characteristics and hence are not very suitable as a bond between the rigid, cured, cementitious composition and the wood, which moves depending on ambient conditions.

The method of the invention enables the production of laminates from wood and concrete or mortar that are of excellent suitability as sustainable components in building construction, especially as roof elements, where there are high demands in relation to aesthetics, sound insulation, strength and stability. In addition, the method of the invention enables the use of hardwood in the construction sector, which is often unusable because of its high tendency to absorb water by comparison with softwood. The adhesive used in the method of the invention, as well as its function as a viscoelastic interlayer, also acts as a moisture barrier and protects the wood side of the laminate from ingress of moisture from the concrete side. The laminates obtained from the method are comparatively lightweight, stable and durable, and are particularly suitable as sustainable components in building construction, especially as a roof element.

Further aspects of the invention are the subject of further independent claims. Particularly preferred embodiments of the invention are the subject of the dependent claims.

WAYS OF EXECUTING THE INVENTION

The invention provides a method of producing a laminate, characterized in that (i) a wood body is provided, (ii) the wood body is coated on its top face with an adhesive applied in liquid form, comprising at least one polymer containing silane groups which is liquid at room temperature, at least one liquid epoxy resin and at least one amine curing agent, (iii) the still-wet adhesive applied is overcoated with a liquid cementitious composition, and (iv) the liquid cementitious composition and the adhesive are each cured.

A "cementitious composition" refers to a cement-containing, hydraulically setting composition, such as mortar or concrete in particular.

A "liquid cementitious composition" refers to a water-containing cementitious composition that has not yet hydraulically set, or has done so only to an insignificant degree, and hence is still free-flowing.

A "mineral filler" refers to a pulverulent or granular inorganic material which is not a hydraulic binder.

A "wet" applied adhesive refers to one that, when tapped with an LDPE pipette, sticks to the pipette.

A "silane group" refers to a silyl group bonded to an organic radical and having one to three, especially two or three, hydrolyzable alkoxy radicals on the silicon atom.

"Aminosilane", "mercaptosilane" or "hydroxysilane" refer respectively to organosilanes having an amino, mercapto or hydroxyl group on the organic radical in addition to the silane group.

The "silicon content" of a polymer containing silane groups refers to the silicon content of the polymer in % by weight based on 100% by weight of polymer. Substance names beginning with "poly", such as polyamine or polyol, refer to substances containing, in a formal sense, two or more of the functional groups that occur in their name per molecule.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen. It is expressed in units of "g/eq".

The "epoxide equivalent weight" refers to the mass of an epoxy group-containing compound or composition that contains one molar equivalent of epoxy groups. It is expressed in units of "g/eq".

"Molecular weight" refers to the molar mass (in grams per mole) of a molecule.

"Average molecular weight" refers to the number-average $M_n$ of a polydisperse mixture of oligomeric or polymeric molecules, which is typically determined by gel-permeation chromatography (GPC) against polystyrene as standard.

A "storage stable" composition refers to one that can be stored at room temperature in a suitable container over a prolonged period, typically over at least 3 months up to 6 months or more, without this storage resulting in any change to an extent relevant to its use.

The "pot life" of an adhesive refers to the maximum period of time between the mixing of the components until the application, in which the mixed adhesive is in a sufficiently free-flowing state and has good ability to wet the wood surface.

The "open time" of an adhesive refers to the maximum period of time for the achievement of a cohesive bond between the mixing of the components until the overcoating of the adhesive applied with the cementitious composition.

"Room temperature" refers to a temperature of 23° C.

All industry standards and norms mentioned in this document refer to the versions valid at the date of first filing, unless otherwise stated.

Percentages by weight (% by weight) refer to the proportions by mass of a constituent in a composition based on the overall composition, unless otherwise stated. The terms "mass" and "weight" are used synonymously in the present document.

The wood body preferably consists of hardwood or softwood, preferably beechwood or sprucewood. These types of wood have high mechanical durability and are widely used in the building industry.

In particular, the wood body consists of beechwood. This is widely available and particularly hard and durable. But because of its high swellability under the influence of moisture, it has been used comparatively rarely to date as building material.

Suitable wood bodies are all kinds of shaped bodies made of wood. Preference is given to shaped bodies having at least one flat face.

The wood body is preferably provided such that a horizontal, flat face faces upward, also referred to hereinafter as "top side".

The wood body preferably has the shape of a cube or cuboid, especially a cuboid. In the case of a cuboid, it is preferably positioned such that one of the largest faces is at the top and hence forms the top side. The side at right angles to the top side is also referred to hereinafter as "thickness".

The wood body preferably has a thickness in the range from 10 to 300 mm, preferably 20 to 200 mm. The thickness of the wood body (H) is shown by way of example in FIG. 1, labelled $D_H$.

The top side of the wood body preferably has a length in the range from 0.3 to 20 m, preferably 1 to 10 m. The length of the wood body (H) is shown by way of example in FIG. 1, labelled L.

The top side of the wood body preferably has a width in the range from 50 to 2'000 mm, preferably 100 to 1'500 mm, especially 150 to 1'000 mm. The width of the wood body (H) is shown by way of example in FIG. 1, labelled B.

The wood body preferably has the shape of a cuboid, where the length is greater than the width and the width is greater than the thickness. Such a wood body may also be referred to as a board, beam or bar.

The wood body may consist of unglued solid wood, or it may consist of glued and/or interdigitated laminated wood consisting of laminas or square rods. Especially for large wood bodies having lengths of 1 m or more and widths of 150 mm or more, laminar laminated wood is preferred owing to particularly good mechanical durability and dimensional stability.

The wood body may be pretreated prior to the applying of the adhesive in step (ii). It is preferably freed of dust.

Mechanical pretreatment in the form of roughening or machining of grooves or slits is possible, but is unnecessary for good bonding and hence not preferred.

Pretreatment by means of activators or primers is possible, but is likewise unnecessary for good bonding.

There is preferably no application of primer to the wood body before step (ii). Such a method is particularly rapid and simple, and the result is a highly durable and stable laminate.

The constituents of the adhesive are especially mixed shortly before application in step (ii), so as to result in a macroscopically homogeneous liquid. The mixing can be effected batchwise or continuously, by means of an automated mixing and metering unit via a static mixer, or with the aid of a dynamic mixer.

Preferably, the freshly mixed adhesive has a fluid consistency with slightly thixotropic properties, such that it can be distributed precisely by means of a squeegee or trowel on the top side of the wood body without flowing away excessively.

The constituents of the adhesive, before they are mixed, are preferably present in at least two separately packaged components, of which the first component contains the amine curing agent and the second component the liquid epoxy resin, and the polymer containing silane groups is a constituent of the first and/or the second component or a separately packaged third component. The polymer containing silane groups is preferably a constituent of the first and/or second component, especially a constituent of the first component. The further constituents of the adhesive may be present in the first or second component or as a constituent of a further component. The further constituents are suitably distributed between the components such that the first and second and any further components are storage-stable in a moisture-tight package.

The mixing is followed, in step (ii), by the application of the liquid adhesive to the top side of the wood body, suitably within the pot life.

The application is preferably effected by pouring or application from a cartridge or application gun, and if necessary a distribution by a suitable method, especially by squeegee, trowel or doctor. Likewise possible is application by a spraying method.

Preferably, the adhesive in step (ii) is applied in a layer thickness in the range from 0.1 to 10 mm, preferably 0.2 to 7 mm, especially 0.3 to 5 mm. The layer thickness of the adhesive (K) is shown by way of example in FIG. 1, labelled $D_K$.

The mixing of the components and the application of the adhesive are preferably effected at ambient temperature, which is typically in the range from about 5 to 45° C., preferably about 10 to 35° C.

The mixing of the components commences the curing of the adhesive by chemical reaction. This increases the viscosity of the liquid adhesive gradually until gelation, and the end result is the solid adhesive with a surface which is possibly still tacky at first, but ultimately dry.

Within the open time of the adhesive, during which the adhesive is still wet, i.e. uncured, the still-wet adhesive applied is overcoated in step (iii) with the liquid cementitious composition. Step (iii) is thus effected before the adhesive applied has formed a skin on its surface. Such a procedure is also referred to as "wet-on-wet" application.

Step (iii) is preferably effected at a juncture at which the adhesive has already undergone a certain increase in viscosity as a result of the first crosslinking reactions of the reactive groups. The increase in viscosity is preferably at least 10%, especially at least 30%, based on the initial viscosity that has been measured 5 min after the mixing of the components of the adhesive at 20° C. by means of a cone-plate viscometer at a shear rate of 10 $s^{-1}$.

Preferably, the wood body on application of the liquid cementitious composition in step (iii) has been provided with formwork elements on the outer sides, for example in an extension of the lateral edges, such that the liquid cementitious composition remains on the surface of the wood body after the application and cannot flow away. In FIG. 1, the thickness $D_H$ of the wood body (H) is apparent by way of example. The formwork elements are preferably mounted such that they enclose the thickness $D_H$ of the wood body and project upward to such an extent that, in the case of complete filling of the volume formed with the liquid cementitious composition, they form a complete formwork having a suitable height for application of the adhesive and the cementitious composition. The height of the formwork elements preferably corresponds to the thickness D of the laminate, as shown by way of example in FIG. 1.

Suitable formwork elements are boards or other devices that can be removed after the cementitious composition has hardened, as customary in concrete construction.

The formwork elements are preferably mounted before or after step (ii), especially prior to step (ii).

Rebars are optionally mounted on the applied adhesive before step (iii), and these are positioned by means of spacers such that they are cast into and surrounded by the cementitious composition on overcoating of the adhesive. This enables laminates having particularly high strength. It is possible to use any of the rebars that are customarily used in mortar or concrete engineering. Likewise suitable are reinforcing elements made of fibers or weaves, for example weaves of glass fibers or carbon fibers. Suitable polypropylene fibers are available, for example, under the SikaFiber® trade name (from Sika). Suitable lamellar weaves of carbon fibers are available, for example, under the Sika® CarboDur® trade name (from Sika).

The cementitious composition is produced by mixing the constituents prior to application. It is possible here to use a dry mixture containing the cement and further additives, which is made up with water shortly prior to application.

The liquid cementitious composition in step (iii) preferably has not too thin a consistency, but one which is still pourable, where the water content is such as to result in high strength coupled with low shrinkage on hardening.

On application, the preferably mounted formwork elements prevent the cementitious composition from flowing away. The formwork elements together with the coated top side of the wood body preferably form a casting mold for the liquid cementitious composition, of which the coated top side of the wood body forms the base. The formwork elements preferably project above the coated top side of the wood body to such an extent that the depth of the casting mold corresponds to the desired layer thickness of the cementitious composition.

Preferably, the liquid cementitious composition in step (iii) is applied in a layer thickness in the range from 10 to 300 mm, preferably 20 to 200 mm, especially 30 to 100 mm. The layer thickness of the cementitious composition (Z) is shown by way of example in FIG. 1, labelled $D_Z$.

In step (iii), the liquid cementitious composition is preferably applied so as to result in a horizontal surface. The cementitious composition is optionally compacted by a suitable method. Suitably, the surface of the cementitious composition is smoothed toward the end of the application, for example by means of a spatula or brick trowel.

This is followed, in step (iv), by the curing of the liquid cementitious composition and the adhesive.

Preferably, the curing in step (iv) is effected by standing at ambient temperature, optionally with protection of the cementitious composition on the surface against drying-out by means of a polymer film.

The adhesive cures via chemical reaction of the reactive groups present, especially silane groups, epoxy groups and amino groups, with amine hydrogens until its final strength is attained. At the same time, the cementitious composition beneath likewise cures via hydraulic setting of the cement present and ultimately attains its final strength. In the course of curing, high bond strengths of the adhesive to the wood and to the cured cementitious composition develop, as a result of which the laminate obtained from the method has a stable bond between the wood body and the layer of the cementitious composition.

The duration of the curing process is dependent on the ambient temperature, the ingredients used in the adhesive or cementitious composition, and the presence of curing accelerators in the compositions. Typically, formwork elements present are removed after about one to two days, and the laminate attains its final strength after a few days or weeks at room temperature.

The adhesive used in the method comprises at least one polymer containing silane groups which is liquid at room temperature, at least one liquid epoxy resin and at least one amine curing agent.

The polymer containing silane groups is preferably an organic polymer containing silane groups, more particularly a polyolefin, poly(meth)acrylate or polyether or a mixed form of these polymers, each of which bears one or preferably more than one silane group. The silane groups may be present as side chains or terminally at the chain ends.

In particular, the polymer containing silane groups is a polyether containing silane groups. It preferably has a majority of oxyalkylene units, especially 1,2-oxypropylene units.

The polymer containing silane groups has an average of preferably 1.3 to 4, more preferably 1.5 to 3, especially 1.7 to 2.8, most preferably 1.7 to 2.3, silane groups per molecule. The silane groups are preferably terminal.

Preferred silane groups are trimethoxysilane groups, dimethoxymethylsilane groups or triethoxysilane groups.

The polymer containing silane groups preferably has an average molecular weight $M_n$ in the range from 2'000 to 20'000 g/mol, more preferably 3'000 to 15'000 g/mol, especially 4'000 to 10'000 g/mol.

The polymer containing silane groups preferably has an average silicon content in the range from 0.3% to 2% by weight, especially 0.5% to 1.5% by weight.

The polymer containing silane groups is preferably a polyether containing silane groups that has been obtained from one of the following methods:

- reaction of polyethers containing allyl groups with hydrosilanes (hydrosilylation), optionally with chain extension with diisocyanates, for example,
- copolymerization of alkylene oxides and epoxysilanes, optionally with chain extension with diisocyanates, for example,
- reaction of polyether polyols with isocyanatosilanes, optionally with chain extension with diisocyanates, and
- reaction of polyether polyols with diisocyanates to give polyethers containing isocyanate groups and subsequent reaction of isocyanate groups with aminosilanes, hydroxysilanes or mercaptosilanes.

Preferably, the polymer containing silane groups is obtained from the reaction of at least one polyether containing isocyanate groups and at least one amino-, mercapto- or hydroxysilane. This enables particularly high bond strengths of the adhesive.

The polyether containing isocyanate groups is preferably obtained from the reaction of at least one polyether polyol and at least one diisocyanate.

The reaction is preferably carried out with exclusion of moisture at a temperature within a range from 20 to 160° C., especially 40 to 140° C., optionally in the presence of suitable catalysts.

The molar NCO/OH ratio is preferably at least 1.3/1, more preferably at least 1.6/1, especially at least 1.9/1.

Preferred polyether polyols are polyoxypropylene diols or polyoxypropylene triols optionally having terminal oxyethylene groups.

Particular preference is given to polyoxypropylene diols.

Preferred diisocyanates are hexane 1,6-diisocyanate (HDI), 2,2 (4),4-trimethylhexamethylene 1,6-diisocyanate (TMDI), cyclohexane 1,3-diisocyanate, cyclohexane 1,4-diisocyanate, isophorone diisocyanate (IPDI), perhydro(diphenylmethane diisocyanate) ($H_{12}MDI$), 1,3-bis(isocyanatomethyl)cyclohexane, 1,4-bis(isocyanatomethyl)cyclohexane, xylene diisocyanate (XDI), diphenylmethane diisocyanate (MDI), toluene diisocyanate (TDI), phenylene diisocyanate (PDI) or naphthalene diisocyanate (NDI).

Particular preference is given to HDI, IPDI, MDI or TDI, especially IPDI or MDI, or mixtures of these diisocyanates.

Suitable aminosilanes for the reaction with the isocyanate groups are primary or secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane or 3-aminopropyldimethoxymethylsilane and Michael acceptors such as acrylonitrile, (meth)acrylic esters, (meth)acrylamides, maleic diesters, fumaric diesters, citraconic diesters or itaconic diesters, especially diethyl N-(3-trimethoxysilylpropyl)aminosuccinate or diethyl N-(3-dimethoxymethylsilylpropyl)aminosuccinate. Likewise suitable are analogues of the aminosilanes mentioned with ethoxy groups in place of the methoxy groups on the silicon.

Particular preference is given to diethyl N-(3-trimethoxysilylpropyl)aminosuccinate, diethyl N-(3-dimethoxymethylsilylpropyl)aminosuccinate or diethyl N-(3-triethoxysilylpropyl)aminosuccinate. These are easily obtainable and enable particularly high strengths and stabilities of the adhesive.

Suitable mercaptosilanes for the reaction with the isocyanate groups are especially 3-mercaptopropyltrimethoxysilane, 3-mercaptopropyldimethoxymethylsilane or analogues of these mercaptosilanes having ethoxy groups in place of the methoxy groups on the silicon.

Suitable hydroxysilanes for the reaction with the isocyanate groups are especially N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide, N-(3-triethoxysilylpropyl)-2-hydroxypropyl carbamate, 2-morpholino-4 (5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

More preferably, the amino-, mercapto- or hydroxysilane for the reaction with the polyether containing isocyanate groups is an aminosilane, especially diethyl N-(3-trimethoxysilylpropyl)aminosuccinate, diethyl N-(3-dimethoxymethylsilylpropyl)aminosuccinate or diethyl N-(3-triethoxysilylpropyl)aminosuccinate.

The preferred polymers containing silane groups are particularly compatible with liquid epoxy resins and enable adhesives having high strength, high impact resistance and high stability to moisture.

The adhesive further comprises at least one liquid epoxy resin.

Suitable as the liquid epoxy resin are customary technical epoxy resins that are free-flowing at room temperature and have a glass transition temperature of below 25° C. These are obtained in a known manner, more particularly from the glycidylation of compounds having at least two active hydrogen atoms, more particularly polyphenols, polyols or amines, through reaction with epichlorohydrin.

Preference is given to an aromatic liquid epoxy resin, especially a bisphenol A diglycidyl ether or a bisphenol F diglycidyl ether or a phenol novolak glycidyl ether. These have readily manageable viscosity and enable adhesives having high strengths and stabilities.

Preferably, the weight ratio between the polymer containing silane groups and the liquid epoxy resin in the adhesive is in the range from 20/80 to 70/30, preferably 25/75 to 50/50. Such an adhesive has high strength coupled with high impact resistance.

The adhesive also includes at least one amine curing agent capable of curing the liquid epoxy resin.

Suitable amine curing agents are amines having at least two, preferably at least three, amine hydrogens reactive toward epoxy groups. Preference is given to conventional polyamines having aliphatic amino groups and at least three amine hydrogens.

Suitable amine curing agents are also amines having at least two amine hydrogens and at least one silane group, especially aminosilanes such as 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, and analogues thereof with ethoxy groups in place of the methoxy groups on the silicon.

Suitable amine curing agents are also Mannich bases that catalyze the homopolymerization of epoxy resins, such as, in particular, 2,4,6-tris(dimethylaminomethyl)phenol.

Preferably, the amine curing agent is selected from the group consisting of 1,5-diamino-2-methylpentane, 2,2(4),4-trimethylhexamethylenediamine, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, 1-amino-3-aminomethyl-3,5,5-trimethylcyclohexane (IPDA), 2(4)-methyl-1,3-diaminocyclohexane, bis(4-aminocyclohexyl)methane, 2,5(2,6)-bis(aminomethyl)bicyclo[2.2.1]heptane, 1,3-bis(aminomethyl)benzene (MXDA), polyoxypropylenediamines and polyoxypropylenetriamines with average molecular weight $M_n$ in the range from 200 to 500 g/mol, bis(hexamethylene)triamine, triethylenetetramine, tetraethylenepentamine, N,N'-bis(3-aminopropyl)ethylenediamine, N,N-dimethyldi(1,3-propylene)triamine, N-benzylethane-1,2-diamine, the adduct of 1,5-diamino-2-methylpentane or propane-1,2-diamine with cresyl glycidyl ether, 3-aminopropyltrimethoxysilane, 3-aminopropyltriethoxysilane, N-(2-aminoethyl)-3-aminopropyltrimethoxysilane, N-(2-aminoethyl)-3-aminopropyltrimethoxysilane, N-(2-aminoethyl)-3-aminopropyltriethoxysilane, 2,4,6-tris(dimethylaminomethyl)phenol and combinations of these amines.

Preferably, the adhesive contains at least one aminosilane.

Preferably, the adhesive also contains at least one polyamine having aliphatic amino groups and at least three amine hydrogens, especially 1,2-diaminocyclohexane or IPDA or a polyoxypropylenediamine having an average molecular weight $M_n$ in the range from 200 to 500 g/mol, or a combination of these polyamines.

The adhesive preferably also contains 2,4,6-tris(dimethylaminomethyl)phenol.

The adhesive is preferably used as a two-component adhesive, wherein the two components are packed separately and mixed before application.

The first component contains the amine curing agent and any other compounds that are reactive with epoxy groups, the second component contains the liquid epoxy resin and any other compounds containing epoxy groups, and the polymer containing silane groups is a constituent of the first and/or second component. The polymer containing silane groups is preferably a constituent of the first component.

The two components on their own are each storage-stable with exclusion of moisture. When the two components are mixed, primary and/or secondary amino groups react with epoxy groups present, and silane groups react to release an alcohol when they come into contact with water.

The adhesive preferably contains further constituents, especially selected from the group consisting of reactive diluents containing epoxy groups, desiccants, accelerators, water and fillers.

Suitable reactive diluents containing epoxy groups are especially butanediol diglycidyl ether, hexanediol diglycidyl ether, cresyl glycidyl ether, 4-methoxyphenyl glycidyl ether, p-tert-butylphenyl glycidyl ether, 4-nonylphenyl glycidyl ether, cardanol glycidyl ether, benzyl glycidyl ether, 2-ethylhexyl glycidyl ether or glycidyl ethers of natural alcohols, such as in particular $C_8$ to $C_{10}$ or $C_{12}$ to $C_{14}$ or $C_{13}$ to $C_{15}$ alkyl glycidyl ethers. Such reactive diluents are preferably a constituent of the second component.

Suitable desiccants are especially tetraethoxysilane, vinyltrimethoxysilane, vinyltriethoxysilane, organosilanes having a functional group in the $\alpha$-position to the silane group, especially N-(methyldimethoxysilylmethyl)-O-methylcarbamate or (methacryloyloxymethyl)silanes, methoxymethylsilanes, orthoformic esters, and also calcium oxide or molecular sieves. Desiccants are preferably a constituent of that component including the polymer containing silane groups.

Suitable accelerators are especially substances that accelerate the crosslinking of polymers containing silane groups, especially metal catalysts and/or nitrogen compounds.

Suitable metal catalysts are compounds of titanium, zirconium, aluminum or tin, especially organotin compounds, organotitanates, organozirconates or organoaluminates, especially dibutyltin dilaurate, dibutyltin diacetylacetonate or dioctyltin dilaurate.

Suitable nitrogen compounds are especially the amine curing agents mentioned, and amidines or guanidines.

Suitable accelerators are also in particular substances that accelerate the reaction of epoxy groups, especially acids such as salicylic acid or p-toluenesulfonic acid, or nitrates such as, in particular, calcium nitrate, or tertiary amines, phenols or Mannich bases, or compounds having mercapto groups.

The adhesive preferably contains water or a water-releasing substance. As a result, the water needed for the crosslinking of the silane groups has to be taken only partly from the environment, if at all.

The adhesive preferably contains up to 5% by weight, especially up to 2% by weight, of water based on the overall adhesive.

Free water is preferably not in the same component as the polymer containing silane groups.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or lightweight fillers such as hollow glass beads or gas-filled hollow plastic beads (microspheres).

Preferred fillers are calcium carbonates, calcined kaolins, finely divided silicas, industrial carbon blacks or a combination thereof.

The adhesive may contain further additions such as, in particular, plasticizers such as phthalates, hydrogenated phthalates, terephthalates, hydrogenated terephthalates, polyether polyols or other substances known as plasticizers, further crosslinkers such as epoxysilanes or mercaptosilanes, solvents or thinners, pigments, dyes, thickeners, fibers, nanofillers, flame-retardant substances, emulsifiers, wetting agents, defoamers, or stabilizers against oxidation, heat, light or UV radiation.

The adhesive preferably contains

- 10% to 40% by weight of polymers containing silane groups,
- 20% to 60% by weight of liquid epoxy resin,
- 0% to 25% by weight of reactive diluent containing epoxy groups,
- 5% to 30% by weight of amine curing agent,
- 0% to 50% by weight of fillers, and optionally further ingredients, based on the overall adhesive.

The adhesive is preferably used as a two-component adhesive. The first and second components are produced separately and stored in a moisture-tight container. A suitable container is especially a drum, a hobbock, a bucket, a can, a cartridge, an aluminum-coated foil pouch or a tube.

The two components are mixed before or during the application of the adhesive. The mixing ratio is selected preferably such that the groups reactive toward epoxy groups are present in a suitable ratio to the epoxy groups. The ratio of the number of amine hydrogens to the number of epoxy groups is preferably in the range from 0.5 to 1.5, especially 0.8 to 1.2. In parts by weight, the mixing ratio is typically within the range from 1:10 to 10:1.

The mixing of the two components begins the curing by chemical reaction. Epoxy groups react here with amine hydrogens, and silane groups undergo hydrolysis with release of alcohol, forming silanol groups (Si—OH groups) and, through subsequent condensation reactions, siloxane groups (Si—O—Si groups). As a result of these and possibly further reactions, the adhesive cures. If the water for the hydrolysis of the silane groups was not already present in the adhesive, it can penetrate into the adhesive from the wood or the cementitious composition and/or in the form of air humidity.

The cured adhesive has very high strength, high extensibility and high impact resistance. It preferably has a tensile strength of at least 10 MPa, preferably at least 15 MPa, and an elongation at break of at least 10%, determined on dumbbell-shaped test specimens having a length of 75 mm, a bar length of 30 mm, a bar width of 4 mm and a thickness of about 2 mm, in accordance with DIN EN 53504 at a strain rate of 2 mm/min.

The liquid cementitious composition contains at least one cement.

Suitable cements are all available types of cement, and mixtures of two or more types of cement. Examples of suitable cement types are those described in DIN EN 197-1, especially Portland cement (CEM I), Portland composite cement (CEM II), blast furnace slag cement (CEM III), pozzolan cement (CEM IV) or composite cement (CEM V). These main types are divided into subgroups that are familiar to the person skilled in the art. Likewise suitable are cement types that have been produced according to an alternative standard, such as, in particular, ASTM C150 for Portland cement or ASTM C595 for mixed hydraulic cements.

Particularly preferred cements are CEM I Portland cements according to DIN EN 197-1, especially Portland cement types I-42.5, I-42.5 R or I-52.5, or Portland cements according to ASTM C150.

A further preferred cement is calcium aluminate cement or calcium sulfoaluminate cement, optionally in combination with calcium sulfate and/or Portland cement. Particular preference is given to Portland cement.

In addition to cement, the cementitious composition may include what are called supplementary cementitious materials (SMCs). These are materials which, in finely divided form, can react with calcium hydroxide and water to give compounds having cement-like properties. Preferred SMCs are fly ash, slag, metakaolin, pozzolans or silica fume.

In addition, the liquid cementitious composition may contain further mineral substances that can react with water, especially calcium sulfate.

The liquid cementitious composition preferably contains at least one mineral filler. The mineral filler is preferably selected from the group consisting of ground quartz, quartz sand, limestone sand, river sand, aggregate, calcium carbonate, chalk, heavy spar (baryte), dolomite, wollastonite, talc, titanium dioxide and combinations thereof.

The cementitious composition preferably contains a mixture of two or more mineral fillers.

Particular preference is given to ground quartz, quartz sand, aggregate, calcium carbonate, chalk or mixtures thereof.

The liquid cementitious composition preferably further contains water.

The amount of water is preferably such that the composition is in the form of a pasty, free-flowing mass that can be poured and distributed without flowing away excessively. The amount of water required for such a consistency depends on the type of cement, the type and amount of mineral fillers, and the presence of further additives such as plasticizers in particular.

The water cement value (w/c) of the liquid cementitious composition is preferably in the range from 0.2 to 0.75, especially 0.4 to 0.6. This enables the attainment of a high strength and imperviosity of the cured composition.

The liquid cementitious composition preferably contains further additives as customary in cementitious compositions from the prior art, especially selected from the group consisting of accelerators, retardants, flow aids, thickeners, defoamers, water retention agents, pigments and biocides.

The liquid cementitious composition preferably contains at least one Portland cement, at least one mineral filler, water and optionally further additives.

The liquid cementitious composition more preferably contains

- 5% to 60% by weight of Portland cement,
- 20% to 80% by weight, preferably 30% to 70% by weight, of mineral fillers,
- 3% to 30% by weight, preferably 5% to 20% by weight, of water, and
- 0% to 30% by weight, preferably 0.1% to 25% by weight, of further additives, based on the overall liquid cementitious composition.

Cementitious compositions that contain sand and are largely free of coarse aggregate are also referred to as mortar. They especially contain mineral fillers having grain sizes in the range from 0.05 to 4 mm.

Cementitious compositions containing aggregate are also referred to as concrete. They especially contain a mixture of mineral fillers having grain sizes in the range from 0.05 to 4 mm and aggregate having grain sizes of up to 32 mm, especially up to 16 mm.

The solid or dry constituents of the cementitious composition are preferably mixed with water in order to obtain the liquid cementitious composition.

After the addition of water, hydraulic setting of the cement commences, which results in gradual curing of the liquid cementitious composition and formation of a solid, stone-like material, especially a cured mortar or cement.

In the initial phase of curing, it may be advantageous to cover the cementitious composition with a polymer film in order to protect it from drying out. This ensures that sufficient water is available for the hydraulic setting of the cement.

The invention further provides a laminate obtained from the process of the invention.

The laminate comprises a wood layer and the hydraulically cured layer of the cementitious composition that are bonded to one another in a force-fitting manner via the adhesive.

The laminate preferably has the shape of a cuboid.

FIG. 1 shows a laminate as just described for illustrative purposes. This comprises a wood layer (H), an adhesive layer (K), and a layer of a cementitious composition (Z).

The bottom side of the cuboid is preferably formed by the wood side, and the top side of the cuboid by the cementitious composition. The thickness of the wood layer is preferably equal to or greater than the thickness of the cementitious layer. FIG. 1 shows, by way of example, the thickness ($D_H$) of the wood layer (H), the thickness ($D_K$) of the adhesive layer (K), and the thickness ($D_Z$) of the cementitious composition (Z).

The dimensions of the laminate are preferably such that the wood layer is capable of supporting the layer of the cementitious composition without being bent to a significant degree under its weight if there is no support, strengthening or reinforcement.

The laminate is stable and durable. It can especially be transported freely in space without permanent bending. It can be stacked and can come into contact with heat, moisture or UV light without suffering significant losses of stability.

The laminate may also be referred to as a board, beam, bar or sandwich element.

The invention further provides for the use of the laminate as a component in building construction, especially as roof element. The laminate is especially installed as a roof element such that the wood side forms the visible ceiling from the interior, and the side of the cementitious composition is directed toward the roof or an upper story.

The laminate from the method of the invention enables the installation of load-bearing wooden ceilings that are particularly sound- and heat-insulating and stable, require a lower level of hydraulic binder and admixtures and hence are particularly sustainable.

EXAMPLES

Working examples are adduced hereinafter, which are intended to further elucidate the invention described. The invention is of course not limited to these described working examples.

"Standard climatic conditions" ("SCC") refer to a temperature of 23±1° C. and a relative air humidity of 50±5%.

The square-rod laminated beechwood used came from Fagus Suisse SA.

Production of the Adhesive:

Adhesive S1

A first component was produced by mixing the following ingredients in the specified amounts (in parts by weight, PW) by means of a centrifugal mixer (SpeedMixer™ DAC 150, FlackTek Inc.) and storing the mixtures with exclusion of moisture:

- 61.6 PW of linear polymer containing silane groups with terminal trimethoxysilane groups, a polyether skeleton and a silicon content of 0.91% by weight,
- 1.7 PW of vinyltrimethoxysilane,
- 22.8 PW of 1,2-diaminocyclohexane (Dytek® DCH-99, from Invista, AHEW 28.5 g/eq),
- 7.5 PW of polyoxypropylenediamine (Jeffamin® D-400, from Huntsman, AHEW 115 g/eq),
- 2.65 PW of 3-aminopropyltrimethoxysilane (Silquest® A-1110, from Momentive, AHEW 89.7 g/eq),
- 1.8 PW of diisodecyl phthalate (Palatinol® 10-P, from BASF),
- 1.95 PW of catalysts and UV stabilizers.

Likewise produced was a second component, by mixing the following ingredients and storing the mixtures with exclusion of moisture:

- 66.4 PW of bisphenol A diglycidyl ether (Araldite® GY 250, from Huntsman, EEW 187 g/eq),
- 22.1 PW of hexanediol diglycidyl ether (Araldite® DY-H, from Huntsman, EEW 149 g/eq),
- 2.5 PW of emulsifier mixture,
- 1.4 PW of carbon black,
- 7.6 PW of fillers.

For the application, the two components were mixed in a mixing ratio of 0.6/1 in parts by weight of the first component relative to the second component, and processed by means of the centrifugal mixer or another suitable stirrer system to give a homogeneous liquid adhesive mixture, which was applied within 10 min.

In order to characterize the adhesive, the following tests were conducted:

Mixed viscosity was measured 5 min after the two components had been mixed at a temperature of 20° C. with a thermostated Rheotec RC30 cone-plate viscometer (cone diameter 50 mm, cone angle 1°, cone tip-plate distance 0.05 mm) at a shear rate of 10 $s^{-1}$.

For the determination of pot life, an amount of 300 g of the freshly mixed adhesive was stirred in a 500 ml beaker with a spatula at intervals of 5 minutes until the adhesive had thickened to such an extent that it no longer had good workability. For determination of the mechanical properties, the mixed adhesive was poured onto a PTFE-coated film to give a film of thickness 2 mm and stored under standard climatic conditions. After one day, a number of dumbbell-shaped test specimens having a length of 75 mm with a bar length of 30 mm and a bar width of 4 mm were punched out of the film and stored under standard climatic conditions for a further 6 days. Subsequently, these, as described in DIN EN 53504, at a strain rate of 2 mm/min, tensile strength (breaking force), elongation at break, and modulus of elasticity at 0.05% to 0.25% elongation (MoE 0.25%) were determined.

Adhesive S1 had a mixed viscosity of 7.75 Pa·s, a pot life of 35 min, a tensile strength of 20 MPa, an elongation at break of 15% and a 0.25% modulus of elasticity of 779 MPa. It cured to give a nontacky, homogeneous, blister-free material with a silky mat surface and high tensile strength and impact resistance.

In adhesive S1, the weight ratio between the polymers containing silane groups and the bisphenol A diglycidyl ether is 35.7/64.3.

Production of Laminates:

Example 1

A number of laminates were produced under standard climatic conditions, in each case by positioning a 40×50×30 mm wood body made of beechwood on a horizontal base such that an area of 40×50 mm faced upward and the thickness was 30 mm. The surface was freed of dust by means of a brush. Subsequently, 3 g of the mixed adhesive S1 were applied to the clean surface and distributed uniformly by means of a spatula (corresponding to an application rate of 1.5 $kg/m^2$).

The test specimen thus coated was then clamped into a formwork mold that seamlessly surrounded the outer sides of the wood body and projected above the surface of the wood body by 30 mm, so as to form a casting mold for the cementitious composition with a depth of 30 mm.

Subsequently, a freshly made-up mortar (SikaGrout®-212N, from Sika Schweiz AG, made up with 2.9 l of water to 25 kg of dry mortar) was introduced into the casting mold in a layer thickness of 30 mm and hence onto the surface of the wood body coated with adhesive S1, with a wait time after the mixing of the adhesive and the pouring of the mortar of between 20 and 30 min. At the moment of application of the mortar, the adhesive had not yet formed a skin (when the adhesive was tapped with an LDPE pipette, it stuck to the pipette).

The test specimen thus produced was left under standard climatic conditions for 48 h and then the formwork mold was removed. The result was a 40×50×60 mm laminate composed of beechwood of dimensions 40×50×30 mm and cured mortar of dimensions 40×50×30 mm, with firm bonding of wood and mortar via adhesive S1 over an area of 40×50 mm.

A number of such test specimens were stored for 28 d under standard climatic conditions and then subjected to a compressive shear strength test. Compressive shear strength was determined in accordance with DIN EN 392 on the bonded 50×40 mm shear area, at a testing speed of 1 mm/s.

Further test specimens of this kind were stored for 28 d under standard climatic conditions and then for 24 h at room temperature in water, and likewise subjected in the wet state to a compressive shear strength test as described above.

Example 1, after storage under standard climatic conditions for 28 d, showed a compressive shear strength of 3.9 MPa (average of 6 test specimens), with the fracture in each case in the mortar layer close to the adhesive.

After storage for 24 h in water, the wood layer was in each case distinctly swollen (increase in volume about 30%), but the test specimen was otherwise intact. The compressive shear strength of the wet specimens was 2.0 MPa (average of 6 test specimens), with the fracture in each case in the mortar layer close to the adhesive.

Example 2

A number of laminates were produced under standard climatic conditions, in each case by positioning a 1020×60×30 mm wood body made of beechwood on a horizontal base such that an area of 1020×60 mm faced upward and the thickness was 30 mm. The surface was freed of dust by means of a brush. Subsequently, the clean surface was coated with 1.5 $kg/m^2$ of the mixed adhesive S1, and the test specimen was clamped in a formwork mold so as to result in a casting mold of depth 30 mm.

30 min after the adhesive had been applied, a freshly made-up mortar (SikaGrout®-212N, from Sika Schweiz AG, made up with 2.9 l of water to 25 kg of dry mortar) was introduced into the casting mold in a layer thickness of 30 mm and hence onto the surface of the wood body coated with adhesive S1.

The test specimens were left under standard climatic conditions for 48 h and then the formwork mold was removed. The result was a 1020×60×60 mm laminate composed of beechwood of dimensions 1020×60×30 mm and cured mortar of dimensions 1020×60×30 mm, with firm bonding of wood and mortar via adhesive S1 over an area of 1020×60 mm.

A number of such test specimens were stored at 28 d under standard climatic conditions and then subjected to a 3-point bending test to DIN 512186 with a span width of 900 mm, an initial load of 5 N, and a testing speed of 5 mm/min. In order to determine the modulus of elasticity, such test specimens were subjected to an identical test, wherein the testing speed was 2 mm/min and the load range was 100 to 3200 N.

Example 2, in the 3-point bending test, showed a maximum force of 1.2 kN with a maximum deformation of 14 mm (average of 4 test specimens), with the fracture in each case in the mortar layer close to the adhesive. (By comparison, an uncoated beechwood specimen of dimensions 1020×60×60 mm in the same test arrangement showed a maximum force of 1.8 kN with a maximum deformation of 28 mm.)

Example 2, in the 3-point bending test, showed a modulus of elasticity of 14.8 MPa (average of 5 test specimens). (By comparison, an uncoated beechwood specimen of dimensions 1020×60×60 mm in the same test arrangement showed a modulus of elasticity of 13.4 MPa.)

Example 3

A number of laminates were produced under standard climatic conditions by positioning a beam of square-rod laminated wood of dimensions 5200×320×120 mm, made of glued square beechwood timbers (about 2000×40×40 mm), on a horizontal base such that an area of 5200×320 mm faced upward and the thickness was 120 mm. A formwork mold was mounted around the wooden beam, so as to result in a casting mold of depth 60 mm on the surface.

Subsequently, the surface of the wooden beam (=base of the casting mold) was freed of dust by blowing and coated with 1.5 kg/m$^2$ of the mixed adhesive S1 by pouring and distributing by means of a spatula.

Then a reinforcement in the form of a construction steel mesh was placed onto the surface coated with the adhesive over its whole area, and the mesh came to rest at a height of 25 to 35 mm above the adhesive surface by means of spacers in the form of concrete blocks.

Subsequently, a freshly made-up self-compacting concrete (Sikacrete®-16 SCC, from Sika Schweiz AG, made up with 2.2 l of water to 25 kg of dry mix) was poured into the casting mold to mold the concrete into the reinforcement. The wait time between the mixing of the adhesive and the pouring of the concrete was 20 to 30 min.

The arrangement thus produced was covered with a polymer film and left under standard climatic conditions for 48 h, and then the polymer film and the formwork were removed. The laminates thus obtained were stored under standard climatic conditions for a further 26 days and were then ready for use as roof element in building construction. They had dimensions of 5200×320×180 mm without distortions in length, width or height. In particular, they showed no shrinkage cracks and no warpage through shrinkage in the concrete layer, also called “keying”, nor any breaking of the concrete away from the wood surface after curing.

The invention claimed is:

1. A method of producing a laminate, wherein (i) a wood body is provided, (ii) the wood body is coated on its top face with an adhesive applied in liquid form, comprising at least one polymer containing silane groups which is liquid at room temperature, at least one liquid epoxy resin and at least one amine curing agent, (iii) the still-wet adhesive applied is overcoated with a liquid cementitious composition, and (iv) the liquid cementitious composition and the adhesive are each cured.

2. The method as claimed in claim 1, wherein the wood body in step (i) consists of hardwood or softwood.

3. The method as claimed in claim 1, wherein the wood body has a thickness in the range from 10 to 300 mm.

4. The method as claimed in claim 1, wherein no primer is applied to the wood body before step (ii).

5. The method as claimed in claim 1, wherein the adhesive in step (ii) is applied in a layer thickness in the range from 0.1 to 10 mm.

6. The method as claimed in claim 1, wherein the wood body on application of the liquid cementitious composition in step (iii) has been provided with formwork elements on the outer sides, such that the liquid cementitious composition remains on the surface of the wood body after the application and cannot flow away.

7. The method as claimed in claim 1, wherein the liquid cementitious composition in step (iii) is applied in a layer thickness in the range from 10 to 300 mm.

8. The method as claimed in claim 1, wherein the curing in step (iv) is effected by standing at ambient temperature.

9. The method as claimed in claim 1, wherein the polymer containing silane groups has an average silicon content in the range from 0.3 to 2% by weight.

10. The method as claimed in claim 1, wherein the polymer containing silane groups has been obtained from the reaction of at least one polyether containing isocyanate groups and at least one amino-, mercapto- or hydroxysilane.

11. The method as claimed in claim 1, wherein the weight ratio between the polymer containing silane groups and the liquid epoxy resin in the adhesive is in the range from 20/80 to 70/30.

12. The method as claimed in claim 1, wherein the amine curing agent is selected from the group consisting of 1,5-diamino-2-methylpentane, 2,2(4),4-trimethylhexamethylenediamine, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, 1-amino-3-aminomethyl-3,5,5-trimethylcyclohexane, 2(4)-methyl-1,3-diaminocyclohexane, bis(4-aminocyclohexyl)methane, 2,5(2,6)-bis(aminomethyl)bicyclo[2.2.1]heptane, 1,3-bis(aminomethyl)benzene, polyoxypropylenediamines and polyoxypropylenetriamines with average molecular weight Mn in the range from 200 to 500 g/mol, bis(hexamethylene)triamine, triethylenetetramine, tetraethylenepentamine, N,N'-bis(3-aminopropyl)ethylenediamine, N,N-dimethyldi(1,3-propylene)triamine, N-benzylethane-1,2-diamine, N-benzylpropane-1,2-diamine, N-benzyl-1,3-bis(aminomethyl)benzene, N-(2-phenylethyl)-1,3-bis(aminomethyl)benzene, the adduct of 1,5-diamino-2-methylpentane or propane-1,2-diamine with cresyl glycidyl ether, 3-aminopropyltrimethoxysilane, 3-aminopropyltriethoxysilane, N-(2-aminoethyl)-3-aminopropyltrimethoxysilane, N-(2-aminoethyl)-3-aminopropyltrimethoxysilane, N-(2-aminoethyl)-3-aminopropyltriethoxysilane, 2,4,6-tris(dimethylaminomethyl)phenol and combinations of these amines.

13. The method as claimed in claim 1, wherein the liquid cementitious composition contains at least one Portland cement, at least one mineral filler, and water.

14. A laminate obtained from the method as claimed in claim 1.

15. A component for building construction comprising the laminate as claimed in claim 14.

16. The method as claimed in claim 1, wherein the wood body in step (i) consists of beechwood or sprucewood.

17. The method as claimed in claim 8, wherein in step (iv) the surface of the cementitious composition is covered by a polymer film to prevent drying out.

* * * * *